US010564830B2

(12) United States Patent
Kim

(10) Patent No.: US 10,564,830 B2
(45) Date of Patent: *Feb. 18, 2020

(54) DISPLAY APPARATUS AND CONTROLLING METHOD THEREOF

(71) Applicant: SAMSUNG ELECTRONICS CO., LTD., Suwon-si (KR)

(72) Inventor: Young-kook Kim, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/233,574

(22) Filed: Dec. 27, 2018

(65) Prior Publication Data
US 2019/0138193 A1 May 9, 2019

Related U.S. Application Data

(63) Continuation of application No. 15/437,952, filed on Feb. 21, 2017, now Pat. No. 10,203,856.

(30) Foreign Application Priority Data
Jun. 7, 2016 (KR) .................. 10-2016-0070116

(51) Int. Cl.
G06F 3/0484 (2013.01)
G06F 3/0482 (2013.01)
(Continued)

(52) U.S. Cl.
CPC ........ G06F 3/04845 (2013.01); G06F 3/0482 (2013.01); G06F 3/04842 (2013.01);
(Continued)

(58) Field of Classification Search
CPC ............ G06F 3/04845; G06F 3/04842; G06F 3/0482; G06F 3/1454; G06F 3/04883;
(Continued)

(56) References Cited

U.S. PATENT DOCUMENTS 7,091,994 B2 * 8/2006 Hayashi ................ G06F 3/0481
345/629
8,434,019 B2 * 4/2013 Nelson .................. G06F 3/0481
715/798

(Continued)

FOREIGN PATENT DOCUMENTS

EP 1 724 754 A1 11/2006
JP 2004-164307 A 6/2004
(Continued)

OTHER PUBLICATIONS

Communication dated May 9, 2017, issued by the European Patent Office in counterpart European Patent Application No. 17160423.4.

Primary Examiner — Nitin Patel
Assistant Examiner — Amy Onyekaba
(74) Attorney, Agent, or Firm — Sughrue Mion, PLLC

(57) ABSTRACT

A display apparatus and a controlling method are provided. The display apparatus includes a communication interface configured to receive a plurality of image signals from a plurality of external devices, a display configured to display a screen including a plurality of regions respectively corresponding to each of the plurality of image signals, and a processor configured to, in response to a directional touch gesture being input on the display, select a region from among the plurality of regions based on a direction of a directional touch gesture and control the display to display the selected region as a full screen.

16 Claims, 13 Drawing Sheets

(51) Int. Cl.
*G06F 3/147* (2006.01)
*G09G 5/14* (2006.01)
*G06F 3/0488* (2013.01)
*G06F 3/14* (2006.01)
*G09G 3/20* (2006.01)

(52) U.S. Cl.
CPC .......... *G06F 3/04883* (2013.01); *G06F 3/147* (2013.01); *G06F 3/1454* (2013.01); *G09G 3/2096* (2013.01); *G09G 5/14* (2013.01); *G06F 2203/04803* (2013.01); *G09G 2340/0464* (2013.01); *G09G 2354/00* (2013.01); *G09G 2356/00* (2013.01); *G09G 2370/16* (2013.01); *G09G 2380/02* (2013.01)

(58) Field of Classification Search
CPC ........ G06F 2203/04803; G09G 3/2096; G09G 2356/00; G09G 2340/0464; G09G 2354/00
See application file for complete search history.

(56) References Cited

U.S. PATENT DOCUMENTS

| | | | | |
|---|---|---|---|---|
| 2007/0257927 | A1* | 11/2007 | Sakanishi | G09G 5/005 345/581 |
| 2009/0102809 | A1* | 4/2009 | Mamba | G06F 3/04883 345/173 |
| 2010/0095241 | A1* | 4/2010 | Nagano | G06F 3/1454 715/790 |
| 2010/0299638 | A1* | 11/2010 | Choi | G06F 3/04883 715/835 |
| 2010/0309147 | A1 | 12/2010 | Fleizach et al. | |
| 2012/0030595 | A1* | 2/2012 | Itahana | G06F 3/04817 715/765 |
| 2013/0002578 | A1* | 1/2013 | Ito | G06F 3/0488 345/173 |
| 2013/0263042 | A1* | 10/2013 | Buening | G06F 3/0488 715/783 |
| 2013/0321243 | A1 | 12/2013 | Chang et al. | |
| 2014/0215358 | A1* | 7/2014 | Uratani | G06F 3/048 715/753 |
| 2015/0085058 | A1* | 3/2015 | Zhang | H04N 7/142 348/14.02 |
| 2015/0130727 | A1 | 5/2015 | Kim | |
| 2015/0199166 | A1* | 7/2015 | Eguchi | G06F 3/1454 345/2.2 |
| 2015/0378665 | A1* | 12/2015 | Han | H04N 21/4126 345/2.2 |
| 2016/0027402 | A1* | 1/2016 | Yanazume | G06F 3/14 345/2.3 |
| 2016/0057344 | A1* | 2/2016 | Chang | H04N 5/23238 348/38 |
| 2016/0085359 | A1* | 3/2016 | Park | G06F 3/042 345/174 |

FOREIGN PATENT DOCUMENTS

| | | |
|---|---|---|
| JP | 2015-194795 A | 11/2015 |
| JP | 2016-24433 A | 2/2016 |
| KR | 10-0838343 B1 | 6/2008 |
| KR | 10-1163346 B1 | 7/2012 |
| KR | 10-1169560 B1 | 7/2012 |
| KR | 10-1513022 B1 | 4/2015 |
| KR | 10-2015-0054190 A | 5/2015 |
| KR | 10-2015-0114163 A | 10/2015 |

\* cited by examiner

|   |     | p   |     |
|---|-----|-----|-----|
|   |     | (+) | (-) |
| q | (+) | A   | B   |
|   | (-) | C   | D   |

|   |     | p |   |
|---|-----|---|---|
|   |     | (+) | (-) |
| q | (+) | LEFT SIDE BASED ON BASIC SELECTION REGION | RIGHT SIDE BASED ON BASIC SELECTION REGION |
|   | (-) | | |

|   |     | p                                      |                                        |
|---|-----|----------------------------------------|----------------------------------------|
|   |     | (+)                                    | (-)                                    |
| q | (+) | UPPER SIDE BASED ON BASIC SELECTION REGION | |
|   | (-) | LOWER SIDE BASED ON BASIC SELECTION REGION | |

DISPLAY APPARATUS AND CONTROLLING METHOD THEREOF

CROSS-REFERENCE TO RELATED APPLICATION

This application is a continuation of U.S. patent application Ser. No. 15/437,952, filed on Feb. 21, 2017, which claims priority from Korean Patent Application No. 10-2016-0070116, filed in the Korean Intellectual Property Office on Jun. 7, 2016, the disclosure of which is incorporated herein by reference in its entirety.

BACKGROUND

1. Field

Apparatuses and methods consistent with exemplary embodiments relate to a display apparatus, and more particularly, to a display apparatus for selecting one screen among screens respectively corresponding to a plurality of image signals, and a controlling method thereof.

2. Related Art

A display apparatus may be connected to an external device and display an image signal input from the external device on the display unit. In the past, in order to control what is displayed on the display unit, the user had to input a control command directly from an external device that transmits an image signal. As the remote controller has developed, the user can remotely input the control command to the external device. However, this requires an additional remote control to control the external device.

In order to overcome the inconvenience, a display apparatus in which a touch module is disposed on the display unit has been developed. A user can control a remote external device without an additional device by inputting a touch command through the touch module in the vicinity of the display apparatus.

On the other hand, as display units become increasingly larger, a user may recognize individual contents, even if a plurality of contents are displayed. Generally, a user can select one content by selecting an area where content to be selected is displayed. However, because the display unit is larger than the user, the user's hand may not reach the content area to be selected. Further, there is an inconvenience that the user has to move a certain distance in order to select content on the opposite side where the user is located. Therefore, there is a need for a technique that allows convenient selection of displayed content.

SUMMARY

One or more exemplary embodiments provide a display apparatus capable of conveniently selecting one of screens corresponding to a plurality of image signals, and a controlling method thereof.

According to an aspect of an exemplary embodiment, there is provided a display apparatus including: a communication interface configured to receive a plurality of image signals from a plurality of external devices; a display configured to display a screen including a plurality of regions respectively corresponding to each of the plurality of image signals; and a processor configured to, in response to a directional touch gesture being input on the display, select a region from among the plurality of regions based on a direction of the directional touch gesture and control the display to display the selected region as a full screen.

The processor may be further configured to not consider a starting point of the directional touch gesture.

The processor may be further configured to, in response to a touch command being input while the selected region is the displayed as the full screen, control the communication interface to transmit the touch command to an external device that transmits an image signal of the plurality of image signals corresponding to the full screen.

The processor may be further configured to calculate the direction of the directional touch gesture based on a coordinate of a starting point of the directional touch gesture and a coordinate of an ending point of the directional touch gesture.

The processor may be further configured to determine an x-axis value based on a difference between an x-coordinate of the starting point of the directional touch gesture and an x-coordinate of the ending point of the directional touch gesture, determine a y-axis value based on a difference between a y-coordinate of the starting point of the directional touch gesture and a y-coordinate of the ending point of the directional touch gesture, and select the region based on the x-axis value and the y-axis value.

The processor may be further configured to, in a state in which the plurality of regions includes three regions respectively arranged on a left side, a right side and a first middle between the left side and the right side, in response to a touch gesture for selecting one point being input, select an area arranged in the first middle, in response to the x-axis value being positive, select an area arranged on the left side, and in response to the x-axis value being negative, select a region arranged on the right side; and in a state in which the plurality of regions includes three regions arranged on an upper side, a lower side and a second middle between the upper side and the lower side, in response to the touch gesture for selecting the one point being input, select a region arranged in the second middle, in response to the y-axis value being positive, select a region arranged on the upper side, and in response to the y-axis value being negative, select a region arranged on the lower side.

The processor may be further configured to, in a state in which the plurality of images includes four regions respectively arranged on an upper left portion, an upper right portion, a lower left portion, and a lower right portion, in response to the x-axis value being positive and the y-axis value being positive, select a region arranged on the upper left portion, in response to the x-axis value being negative and the y-axis value being positive, select a region arranged on the upper right portion, in response to the x-axis value being positive and the y-axis value being negative, select a region arranged on the lower left portion, and in response to the x-axis value being negative and the y-axis value being negative, select a region arranged on the lower right portion.

The processor may be further configured to select the region based on a moving length of the directional touch gesture.

The processor may be further configured to, in a state in which the plurality of regions are arranged in a horizontal arrangement format in a left direction and a right direction and the x-axis value is positive, in response to an x-axis moving length being less than a first threshold value, select a first region arranged on a rightmost side, in response to the x-axis moving length being greater than the first threshold value and less than a second threshold value, select a second region adjacent to a left side of the first region, and in response to the x-axis moving length being greater than an (n−1) threshold value and less than an n threshold value, select an n region adjacent to a left side of a (n−1) region; and in a state in which a value in the x-axis direction of the directional touch gesture is negative, in response to an x-axis moving length being less than the first threshold value, select the n region, in response to the x-axis moving length being greater than the first threshold value and less than the second threshold value, select the n−1 region adjacent, and in response to the x-axis moving length greater than the (n−1) threshold value and less than the n threshold value, select the second region.

According to an aspect of another exemplary embodiment, there is provided a method of controlling method of a display apparatus, the method including: receiving a plurality of image signals from a plurality of external devices; displaying a screen including a plurality of regions respectively corresponding to each of the plurality of image signals; in response to a directional touch gesture being input on the display, selecting a region from among the plurality of regions based on a direction of the directional touch gesture; and displaying the selected region as a full screen.

The selecting may not include considering a starting point of the directional touch gesture.

The method may further include: in response to a touch command being input while the selected region is the displayed as the full screen, transmitting the touch command to an external device that transmits an image signal of the plurality of signals corresponding to the full screen.

The selecting may include calculating the direction of the directional touch gesture based on a coordinate of a starting point of the directional touch gesture and an ending point of the directional touch gesture.

The selecting may include determining an x-axis value based on a difference between an x-coordinate of the starting point of the directional touch gesture and an x-coordinate of the ending point of the directional touch gesture, determining a y-axis value based on a difference between a y-coordinate of the starting point of the directional touch gesture and a y-coordinate of the ending point of the touch directional gesture, and selecting the region based on the x-axis value and the y-axis value.

The selecting may include, in a state in which the plurality of regions includes three regions respectively arranged on a left side, a right side and a first middle between the left side and the right side, in response to a touch gesture for selecting one point being input, selecting an area arranged in the first middle, in response to the x-axis value being positive, selecting an area arranged on the left side, and in response to the x-axis value being negative, selecting a region arranged on the right side; and in a state in which the plurality of regions includes three regions arranged on an upper side, a lower side and a second middle between the upper side and the lower side, in response to the touch gesture for selecting the one point being input, selecting a region arranged in the second middle, in response to the y-axis value being positive, selecting a region arranged on the upper side, and in response to the y-axis value being negative, selecting a region arranged on the lower side.

The selecting may include, in a state in which the plurality of images includes four regions respectively arranged on an upper left portion, an upper right portion, a lower left portion, and a lower right portion, in response to the x-axis value being positive and the y-axis value being positive, selecting a region arranged on the upper left portion, in response to the x-axis value being negative and the y-axis value being positive, selecting a region arranged on the upper right portion, in response to the x-axis value being positive and the y-axis value being negative, selecting a region arranged on the lower left portion, and in response to the x-axis value being negative and the y-axis value being negative, selecting a region arranged on the lower right portion.

The selecting may include selecting the region based on a moving length of the directional touch gesture.

The selecting may include, in a state in which the plurality of regions are arranged in a horizontal arrangement format arranged in a left direction and a right direction and the x-axis value is positive, in response to an x-axis moving length being less than a first threshold value, selecting a first region arranged on a rightmost side, in response to the x-axis moving length being greater than the first threshold value and less than a second threshold value, selecting a second region adjacent to a left side of the first region, and in response to the x-axis moving length being greater than an (n−1) threshold value and less than an n threshold value, selecting an n region adjacent to a left side of a (n−1) region; and in a state in which a value in the x-axis direction of the directional touch gesture is negative, in response to an x-axis moving length being less than the first threshold value, selecting the n region, in response to the x-axis moving length being greater than the first threshold value and less than the second threshold value, selecting the n−1 region, and in response to the x-axis moving length being greater than the (n−1) threshold value and less than the n threshold value, selecting the second region.

BRIEF DESCRIPTION OF THE DRAWINGS

The above and other aspects will become more apparent from the following description of exemplary embodiments, with reference to the accompanying drawings, in which.

DETAILED DESCRIPTION

Figure 1:
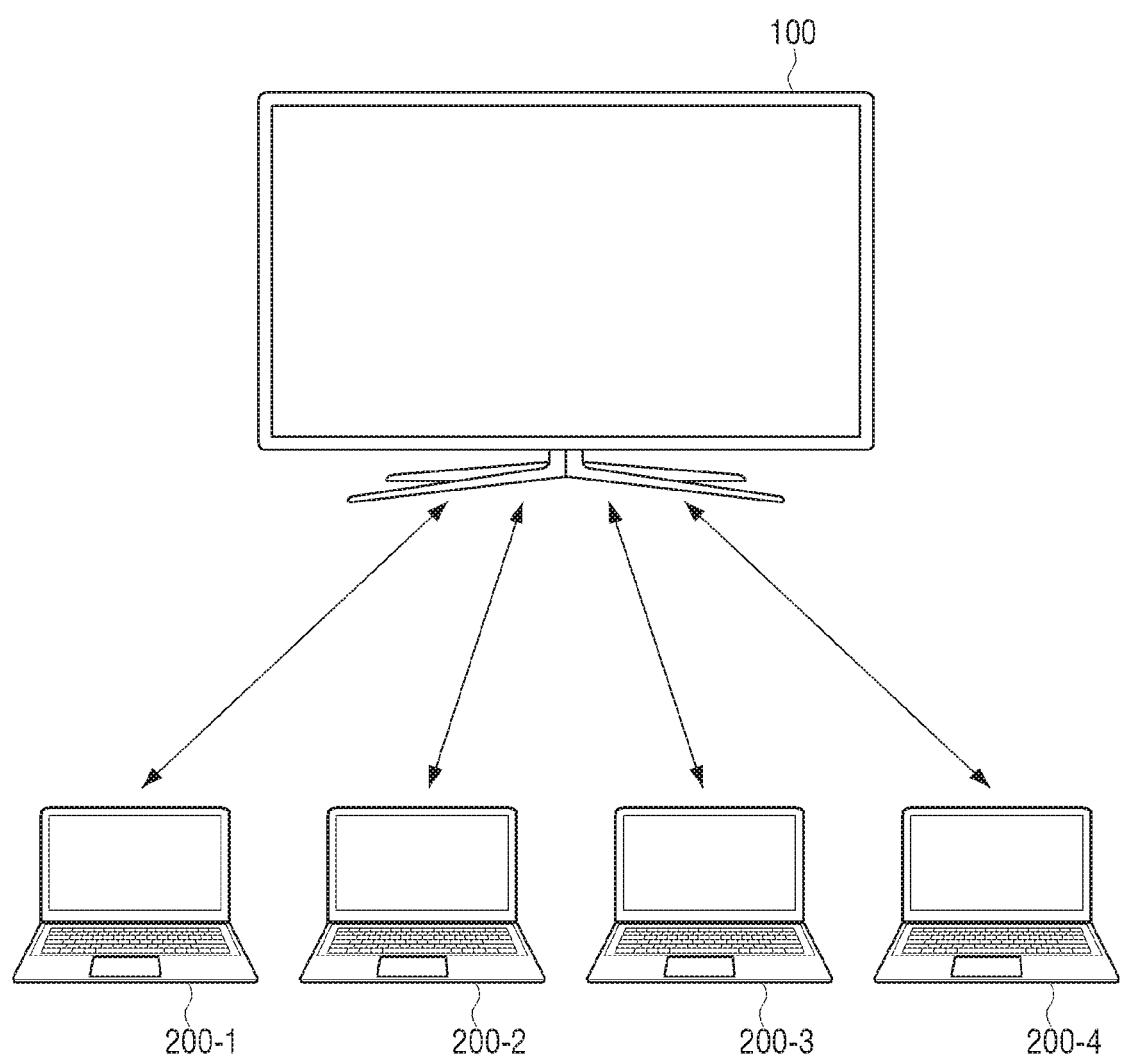
FIG. 1 is a view for explaining a display system according to an exemplary embodiment.

Exemplary embodiments will now be described in detail with reference to the accompanying drawings. The exemplary embodiments described herein can be variously modified. Aspects of exemplary embodiments are described in the drawings and may be described in detail in the detailed description. It should be understood, however, that the specific exemplary embodiments illustrated in the accompanying drawings are only intended to facilitate understanding of the various exemplary embodiments. Accordingly, it is to be understood that the technical idea is not limited by the specific exemplary embodiments illustrated in the accompanying drawings, but includes all equivalents or alternatives falling within the spirit and scope of the invention. In the following description, a detailed description of known functions and configurations incorporated herein will be omitted when it may make the subject matter of the present disclosure rather unclear.

Terms including ordinals, such as first, second, etc., may be used to describe various elements, but such elements are not limited to the above terms. The above terms are used only for the purpose of distinguishing one component from another.

In this specification, the terms "comprise", "include", "have", and the like are intended to specify that there are stated features, numbers, steps, operations, elements, parts or combinations thereof, and should not be construed to preclude the presence or addition of one or more other features, integers, steps, operations, elements, parts, or combinations. It is to be understood that when an element is referred to as being "connected" or "accessed" to another element, it may be directly connected or accessed to the other element, but it should be understood that there may be other components in between. On the other hand, when an element is referred to as being "directly connected" or "directly accessed" to another element, it should be understood that there are no other elements in between.

The terms "module" or "unit" for components used in the present specification performs at least one function or operation. And a "module" or a "unit" may perform functions or operations by hardware, software, or a combination of hardware and software. Also, a plurality of "modules" or a plurality of "units" other than "modules" or "units" that are to be performed in a specific hardware or performed in at least one processor may be integrated into at least one module.

It is to be understood that the singular forms "a," "an," and "the" include plural referents unless the context clearly dictates otherwise.

FIG. 1 is a view for explaining a display system according to an exemplary embodiment.

Referring to FIG. 1, a display system includes a display apparatus 100 and at least one external device 200-1, 200-2, 200-3, and 200-4. For example, the display apparatus 100 may include an electronic blackboard, a television (TV), a kiosk, a video wall, a media pole, and the like. The external devices 200-1, 200-2, 200-3, and 200-4 may include a smart phone, a notebook computer, a personal digital assistant (PDA), a portable media player (PMP), a navigation device, a slate PC, a tablet PC, an ultrabook, a wearable device, and the like.

The external devices 200-1, 200-2, 200-3, and 200-4 may be connected to the display apparatus 100 by wire or wirelessly. Each of the external devices 200-1, 200-2, 200-3, and 200-4 can transmit an image signal to the display apparatus 100. The display apparatus 100 can mix and reconstruct the respective image signals received from the respective external devices 200-1, 200-2, 200-3, and 200-4. That is, the display apparatus 100 may adjust each input image signal to a predetermined resolution in consideration of the number of input image signals, and rearrange the image signals into a single screen by arranging the input image signals according to a predetermined format. In one exemplary embodiment, when the number of input image signals is four, the display apparatus 100 separates the four regions of the upper left region, the lower left region, the upper right region, and the lower right region, and may output the images of the received image signals to each area. Alternatively, the display apparatus 100 may divide four regions horizontally and output an image of the received image signal in each region. Alternatively, the display apparatus 100 may divide four regions vertically and output an image of the received image signal in each region. The display apparatus 100 can change the arrangement format according to the user's selection and adjust the resolution of the input image signal according to the selected arrangement format to output an image in a predetermined area.

The display apparatus 100 may include a touch module receiving a touch command. The display of the display apparatus 100 may have a mutual layer structure with the touch module or may be integrally formed. The display of the display apparatus 100 may function as an input interface for receiving a command from the user through the touch module and an output interface for outputting an image.

The display apparatus 100 may receive a directional touch gesture on the display. The display apparatus 100 can select one of the plurality of areas based on the direction of the input touch gesture. A specific process of selecting one area based on the input touch gesture will be described below.

The display apparatus 100 displays an image of one selected area in full screen. The display apparatus 100 may display an image of one area on the full screen, and then receive a touch gesture through the display. The input touch gesture may be a command to control a selected external device to transmit an image signal corresponding to an image displayed on the full screen. The display apparatus 100 may transmit a command corresponding to the input touch gesture to the selected external device. That is, the selected external device refers to an external device that transmits an image signal corresponding to an image outputted on the full screen. The display apparatus 100 may transmit the input value of the touch gesture to the directly selected external device and may determine the command of the input touch gesture and transmit the determined command value to the selected external device. The selected external device can be controlled in accordance with a control command received from the display apparatus 100.

For example, the display apparatus 100 may display an image of one area on a full screen, and receive a touch gesture corresponding to a command to switch the screen through a display. The display apparatus 100 can transmit the input value of the touch gesture to the selected external device and analyze the inputted touch gesture to determine that it is a screen switching command. The display apparatus 100 may transmit a value corresponding to the screen switching command to the selected external device. The selected external device can directly or indirectly receive a screen switching command from the display apparatus 100. When the selected external device determines the screen switching command, the currently displayed screen can be switched to another screen. The user may control the selected external device through the display apparatus 100 without directly inputting the command to the selected external device for transmitting the image signal.

In the following, the display apparatus 100 will be described based on a block diagram of the display apparatus 100.

Figure 2:
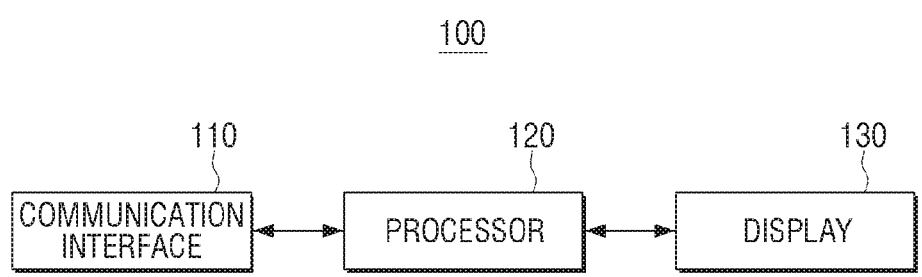
FIG. 2 is a block diagram of a display apparatus according to an exemplary embodiment.

FIG. 2 is a block diagram of a display apparatus according to an exemplary embodiment.

Referring to FIG. 2, the display apparatus 100 includes a communication interface 110, a processor 120, and a display 130.

The communication interface 110 receives a plurality of image signals from a plurality of external devices. The communication interface 110 may receive an image signal from one external device. For example, the communication interface 110 may communicate with an external device using a communication interface, such as Bluetooth, infrared communication, Ultra Wideband (UWB), ZigBee, Wi-Fi, Wireless LAN (WLAN), Digital Living Network Alliance (DLNA), Wireless Broadband (WiBro), High Speed Uplink Packet Access (HSDPA), Long Term Evolution (LTE), and the like. Alternatively, the communication interface 110 may communicate with an external device by wire.

The display 130 displays a screen including a plurality of regions corresponding to each of the plurality of image signals. The display 130 may be a general size display used for a notebook computer, a monitor, a TV, or the like, and may be a display of which width or height is longer than a person's height. The display 130 may include a touch module. The touch module may be implemented integrally with the display 130 and may be implemented separately from the display 130 and disposed on the display 130. The display 130 including the touch module may receive a touch gesture.

When a directional touch gesture is input on the display 130, the processor 120 selects one of the plurality of regions based on the direction of the touch gesture. When the processor 120 selects one area, one area may be selected based only on the direction of the touch gesture. That is, the processor 120 does not consider the starting point of the directional touch gesture.

The processor 120 may calculate the direction of the touch gesture using the relative coordinates of the starting point and the ending point of the directional touch gesture. For example, the processor 120 may determine a value in the x-axis direction based on the difference between the x-coordinates of the starting point and the ending point of the touch gesture, and determine a value in the y-axis direction based on the difference between the y-coordinates of the starting point and the ending point of the touch gesture. Then, the processor 120 may select one of a plurality of regions in a corresponding direction based on the determined values of the x-axis direction and the y-axis direction.

Meanwhile, the processor 120 may select one of the plurality of regions by considering the moving length of the directional touch gesture. For example, when the direction of the touch gesture is the left side and there are a plurality of regions located on the left side, the processor 120 may select a first region if the moving length of the touch gesture is less than a first threshold value, a second region if the moving length of the touch gesture is greater than the first threshold value and less than a second threshold value, and a third region if the moving length of the touch gesture is greater than or equal to the second threshold value. Specific exemplary embodiments will be described below.

The processor 120 then controls the display 130 to display an image of the selected one region in full screen. In addition, when receiving a touch command on the displayed full screen, the processor 120 may control the communicator to transmit the touch command to an external device that transmits an image signal corresponding to the full screen.

Figure 3:
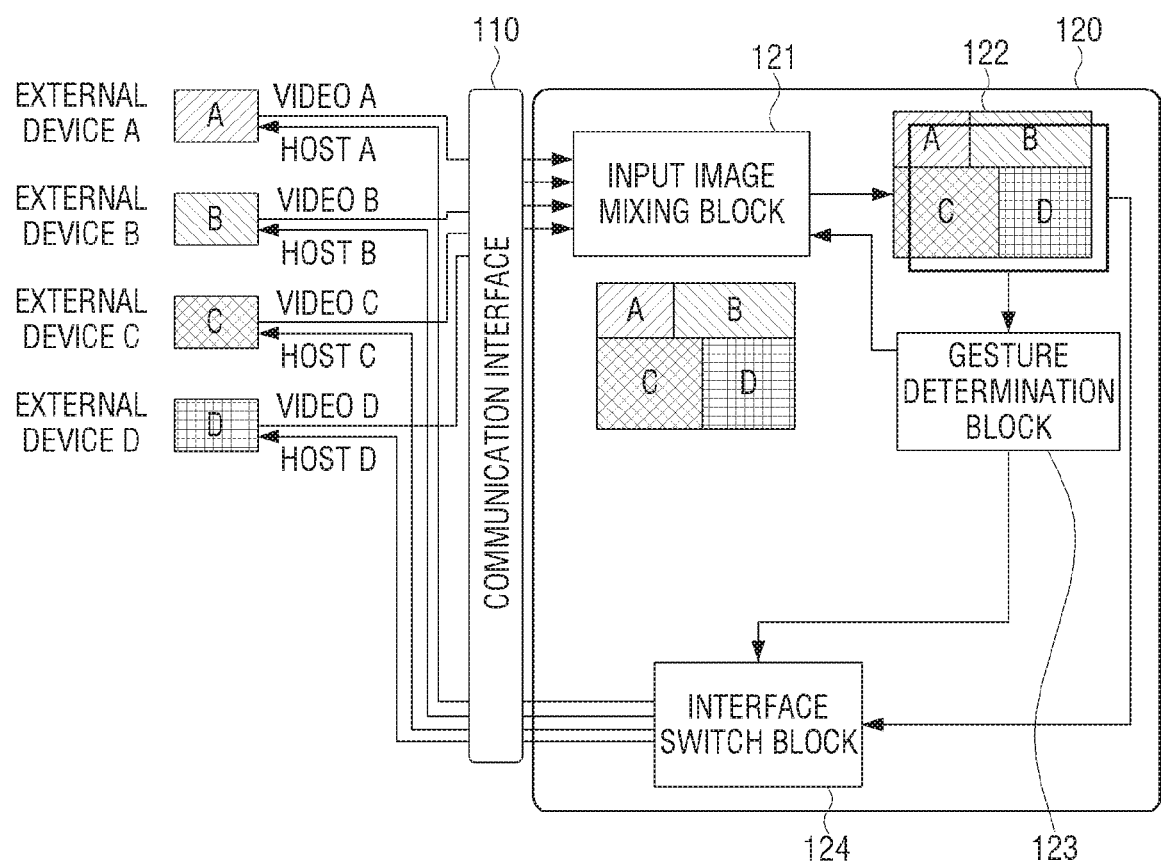
FIG. 3 is a view for explaining a detailed configuration of a display apparatus according to an exemplary embodiment.

FIG. 3 is a view for explaining a detailed configuration of a display apparatus according to an exemplary embodiment.

Referring to FIG. 3, the processor 120 of the display apparatus 100 may include an input image mixing block 121, an image interface 122, a gesture determination block 123, and an interface switch block 124.

The input image mixing block 121 may receive a plurality of image signals from a plurality of external devices, mixes the received image signals, and reconstructs them into one screen. The plurality of external devices may transmit the respective image signals to the display apparatus 100. The display apparatus 100 may receive the respective image signals through the wired/wireless communication interface 110. Each of the received image signals may be transmitted to the input image mixing block 121 of the processor 120. The input image mixing bock 121 may mix the respective image signals based on a predetermined resolution and a predetermined format. The meaning of mixing does not mean that each video signal is overlapped, but means that one image is divided into a plurality of regions and an image corresponding to each image signal is arranged in each region. In one exemplary embodiment, when there are four input image signals, the input image mixing block 121 may divide one screen into an upper left region, a lower left region, an upper right region, and a lower right region, and may arrange an image corresponding to an image signal A in the upper left region, an image corresponding to an image signal B in the upper right region, an image corresponding to an image signal C in the lower left region, and an image corresponding to an image signal D in the lower right region. The input image mixing block 121 may switch to another format according to a user's input, and may change the size of each area. In addition, the input image mixing block 121 may display images of appropriate resolution in the respective regions according to the resolution of the input image signal, the number of divided regions, the shape of the divided regions, and the like.

The image interface 122 may transfer the screen reconstructed in the input image mixing block 121 to the display 130. The display 131 may include a touch module to recognize a touch gesture input on the display. The display 130 may receive a directional touch gesture.

The gesture determination block 123 may determine the touch gesture input on the display. A full screen may include four corner coordinate points. For example, a display at HD resolution may have a resolution of 1920×1080. Therefore, the coordinates of (0, 0) may be set at the upper left corner, (1919, 0) at the upper right corner, (0, 1079) at the lower left corner, and (1919, 1079) at the lower right corner. In one exemplary embodiment, the gesture determination block 123 may determine the difference between the starting point of the touch gesture and the coordinates of each corner. In addition, the gesture determination block 123 may determine the difference between the ending point of the touch gesture and the coordinates of each corner. The gesture determination block 123 may determine that the touch gesture has moved in a corner direction where the difference between the coordinates of the ending point of the touch gesture is smaller than the difference between the coordinates of the starting point of the touch gesture. The processor 120 may then select a region associated with the determined corner.

Specifically, when the starting coordinates of the touch gesture is (959, 539), the starting coordinates of the touch gesture differs from the coordinates of the upper left corner by (959, 539), differs from the coordinates of the upper right corner by (960 539), differs from the lower left corner by (959, 540), and differs from the coordinates of the lower right corner by (960, 540). If the touch gesture moves in the upper left direction and the ending coordinate is (353, 278), the ending coordinate of the touch gesture differs from the upper left corner coordinate by (353, 278), differs from the upper right corner coordinate by (1566, 278), differs from the lower left corner coordinate by (353, 801), and differs from the lower right corner coordinate by (1566, 801). Since the increase/decrease of the difference between the corner coordinates and the touch gesture coordinates is calculated according to the movement of the touch gesture, all the coordinate values can be calculated as absolute values.

Considering the variation in the difference from each corner coordinate due to the movement of the touch gesture, in the case of the upper right corner, both the difference of x-axis coordinate and the difference of y-axis coordinate are reduced. Therefore, the gesture determination block 123 may determine that the touch gesture has moved in the upper left direction. The moving direction of the touch gesture may be determined using the difference between the coordinates of the starting point of the touch gesture and the coordinates of the ending point irrespective of the corner coordinates. Then, the processor 120 may select an A image arranged in the upper left region. The processor may display the A image in full screen.

Meanwhile, the interface switch 124 may connect the processor with an external device corresponding to a selected one of a plurality of regions. That is, the interface switch 124 may transmit the command of the touch gesture determined by the gesture determination block 123 to an external device A corresponding to the A image. Alternatively, the interface switch 124 may bypass the gesture determination block 123 and transmit an input value of a touch gesture inputted on the display to the external device.

Hereinbelow, a process of selecting one of a plurality of regions by determining the direction and moving distance of a directional touch gesture will be described.

Figures 4A, 4B:
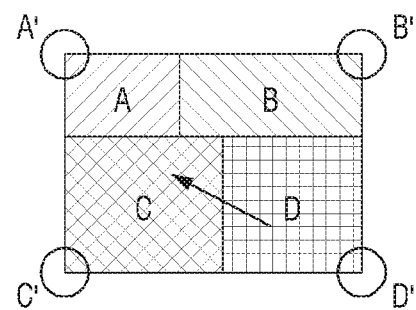
FIGS. 4A and 4B are views for explaining a first exemplary embodiment for selecting one of a plurality of regions.

FIGS. 4A and 4B are views for explaining a first exemplary embodiment for selecting one of a plurality of regions.

Referring to FIG. 4A, a screen including a plurality of regions corresponding to a plurality of image signals is shown. There are four image signals, and the A image signal may correspond to the upper left region, the B image signal to the upper right region, the C video signal to the lower left region, and the D video signal to the lower right region. A' is the upper left corner, B' is the upper right corner, C' is the lower left corner, and D' is the lower right corner. The touch gesture on the display may be moved in the upper left direction. The starting position of the touch gesture is independent of the region selection.

Referring to FIG. 4B, a table for explaining a method of determining the moving direction of the touch gesture is shown.

In one exemplary embodiment, the direction of the touch gesture may be determined using the relative coordinate difference between the starting and ending points of the touch gesture. The x-coordinate may decrease as the touch gesture moves in the left direction, and the x-coordinate may increase as it moves in the right direction. When the touch gesture moves in the upward direction, the y-coordinate decreases. When the touch gesture moves in the downward direction, the y-coordinate increases. The table shown in FIG. 4B is a table showing the difference from the ending coordinates based on the starting coordinates. As shown in FIG. 4A, when the touch gesture moves in the upper left direction, the x-coordinate and the y-coordinate are decreased based on the starting coordinates of the touch gesture. When the difference from the ending coordinate is calculated based on the starting coordinate, the difference (p) of the x-coordinate of the touch gesture and the difference (q) of the y-coordinate are all positive. The display apparatus 100 may, if the difference between the x-coordinate and the y-coordinate is positive, determine that the touch gesture has moved in the upper left direction and select the region of the A image signal in the upper left direction.

When the touch gesture moves in the upper right direction, the x-coordinate increases and the y-coordinate decreases based on the starting coordinates of the touch gesture. When the difference from the ending coordinate is calculated based on the starting coordinate, the difference (p) of the x-coordinate of the touch gesture is negative and the difference (q) of the y-coordinate is positive. The display apparatus 100 may determine that the touch gesture has moved in the upper right direction and may select the region of the B image signal in the upper right direction if the difference in x-coordinate is negative and the difference in y-coordinate is positive.

When the touch gesture moves in the lower left direction, the x-coordinate decreases and the y-coordinate increases based on the starting coordinates of the touch gesture. When the difference from the ending coordinate is calculated based on the starting coordinate, the difference (p) of the x-coordinate of the touch gesture is positive and the difference (q) of the y-coordinate is negative. The display apparatus 100 may determine that the touch gesture has moved in the lower left direction and may select the region of the C image signal in the lower left direction if the difference in x-coordinate is positive and the difference in y-coordinate is negative.

When the touch gesture moves in the lower right direction, the x-coordinate and the y-coordinate are increased based on the starting coordinates of the touch gesture. When the difference from the ending coordinate is calculated based on the starting coordinate, the difference (p) of the x-coordinate of the touch gesture and the difference (q) of the y-coordinate are all negative. The display apparatus 100 may determine that the touch gesture has moved in the lower right direction and may select the region of the D image signal in the lower right direction if the difference in x-coordinate is negative and the difference in y-coordinate is negative.

That is, the display apparatus 100 may determine a value in the x-axis direction based on the difference between the x-coordinates of the starting point and the ending point of the touch gesture, and determine a value in the y-axis direction based on the difference between the y-coordinates. The display apparatus 100 may select a region of a corresponding direction of the plurality of regions based on the determined values of the x-axis direction and the y-axis direction.

As another exemplary embodiment, the display apparatus 100 may determine the direction of the touch gesture based on the change in the difference between the corner coordinates and the touch gesture coordinates according to the movement of the touch gesture. The difference between the corner coordinates and the coordinates of the touch gesture coordinate can be expressed as an absolute value. As described above, when the touch gesture moves, the difference between the coordinates of the touch gesture and the corner coordinates close to the moving direction is reduced. That is, the display apparatus 100 may determine that the touch gesture moves toward a corner in the direction in which the difference between the coordinates of the touch gesture and the corner coordinates decreases. For example, in the case where A' coordinate is (0, 0), B' coordinate is (1000, 0), C' coordinate is (0, 1000), and D' coordinate is (1000, 1000) and the starting coordinates of the touch gesture are (500, 500), when the touch gesture moves in the upper left direction, the x and y coordinates of the touch gesture decrease. Accordingly, the difference between the x-axis value and y-axis value between the A' coordinate and the touch gesture coordinate decreases. The display apparatus 100 may determine that the touch gesture moves in the A corner direction. If the touch gesture moves in the upper right direction, the x-coordinate of the touch gesture increases and the y-coordinate decreases. Accordingly, the difference between the x-axis value and y-axis value between the B' coordinate and the touch gesture coordinate decreases. The display apparatus 100 may determine that the touch gesture moves in the B corner direction.

If the touch gesture moves in the lower left direction, the x-coordinate of the touch gesture decreases and the y-coordinate increases. Accordingly, the difference between the x-axis value and y-axis value between the C' coordinate and the touch gesture coordinate decreases. The display apparatus 100 may determine that the touch gesture moves in the C corner direction. If the touch gesture moves in the lower right direction, the x and y coordinates of the touch gesture increase. Accordingly, the difference between the x-axis value and y-axis value between the D' coordinate and the touch gesture coordinate decreases. The display apparatus 100 may determine that the touch gesture moves in the D corner direction.

Figures 5A, 5B:
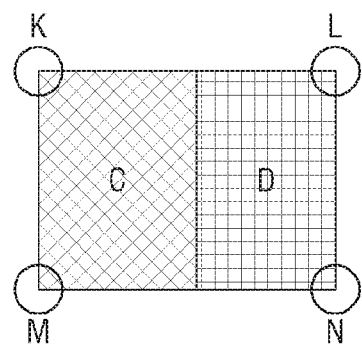
FIGS. 5A and 5B are views for explaining a second exemplary embodiment for selecting one of a plurality of regions.

FIGS. 5A and 5B are views for explaining a second exemplary embodiment for selecting one of a plurality of regions.

Referring to FIG. 5A, a screen including a plurality of regions corresponding to a plurality of image signals is shown. There are two image signals, and the C image signal may correspond to the left region, and the D image signal may correspond to the right region. K is the upper left corner, L is the upper right corner, M is the lower left corner, and N is the lower right corner.

Referring to FIG. 5B, a table for explaining a method of determining the moving direction of the touch gesture is shown.

In one exemplary embodiment, the direction of the touch gesture may be determined using the relative coordinate difference between the starting and ending points of the touch gesture. The table shown in FIG. 5B is a table showing the difference from the ending coordinates based on the starting coordinates. When the touch gesture moves in the left direction, the x-coordinate decreases based on the starting coordinates of the touch gesture. When the difference from the ending coordinate is calculated based on the starting coordinate, the difference (p) of the x-coordinate of the touch gesture is positive. If the difference in x coordinate is positive, the display apparatus 100 may determine that the touch gesture has shifted to the left side, and select a region of the C image signal in the left direction. Since the display screen is divided into a left region and a right region, there is no influence on the y-coordinate.

When the touch gesture moves in the right direction, the x-coordinate increases based on the starting coordinates of the touch gesture. When the difference from the ending coordinate is calculated based on the starting coordinate, the difference (p) of the x-coordinate of the touch gesture is negative. If the difference in x coordinate is negative, the display apparatus 100 may determine that the touch gesture has shifted to the right side, and select a region of the D image signal in the right direction.

As another exemplary embodiment, the display apparatus 100 may determine the direction of the touch gesture based on the change in the difference between the corner coordinates and the touch gesture coordinates according to the movement of the touch gesture. The difference between the corner coordinates and the coordinates of the touch gesture coordinate can be expressed as an absolute value. As described above, when the touch gesture moves, the difference between the coordinates of the touch gesture and the corner coordinates close to the moving direction is reduced. That is, the display apparatus 100 may determine that the touch gesture moves toward a corner in the direction in which the difference between the coordinates of the touch gesture and the corner coordinates decreases. For example, in the case where K-corner coordinate is (0, 0), L-corner coordinate is (1000, 0), M-corner coordinate is (0, 1000), and N-corner coordinate is (1000, 1000) and the starting coordinates of the touch gesture are (500, 500), when the touch gesture moves in the left direction, the x-coordinate of the touch gesture decrease. Accordingly, the difference between the x-axis values between the K-corner coordinates or the M-corner coordinates and the touch gesture coordinates decreases. The display apparatus 100 may determine that the touch gesture moves in the direction of the K-corner or the M-corner. If the touch gesture moves to the right, the x-coordinate of the touch gesture increases. Accordingly, the difference between the x-axis values between the L-corner coordinates or the N-corner coordinates and the touch gesture coordinates decreases. The display apparatus 100 may determine that the touch gesture moves in the direction of the L-corner or the N-corner.

Figures 6A, 6B:
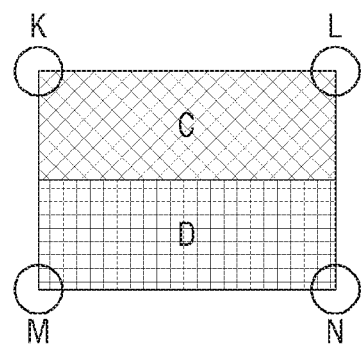
FIGS. 6A and 6B are views for explaining a third exemplary embodiment for selecting one of a plurality of regions.

FIGS. 6A and 6B are views for explaining a third exemplary embodiment for selecting one of a plurality of regions.

Referring to FIG. 6A, a screen including a plurality of regions corresponding to a plurality of image signals is shown. There are two image signals, and the C image signal may correspond to the upper region, and the D image signal may correspond to the lower region. K is the upper left corner, L is the upper right corner, M is the lower left corner, and N is the lower right corner.

Referring to FIG. 6B, a table for explaining a method of determining the moving direction of the touch gesture is shown.

In one exemplary embodiment, the direction of the touch gesture may be determined using the relative coordinate difference between the starting and ending points of the touch gesture. When the touch gesture moves in the upward direction, the y-coordinate decreases based on the starting coordinates of the touch gesture. When the difference from the ending coordinate is calculated based on the starting coordinate, the difference (q) of the y-coordinate of the touch gesture is positive. If the difference in y-coordinate is positive, the display apparatus 100 may determine that the touch gesture has shifted in the upward direction, and select a region of the C image signal in the upward direction. Since the display screen is divided into an upper region and a lower region, there is no influence on the x-coordinate.

When the touch gesture moves in the downward direction, the y-coordinate increases based on the starting coordinates of the touch gesture. When the difference from the ending coordinate is calculated based on the starting coordinate, the difference (q) of the y-coordinate of the touch gesture is negative. If the difference in y-coordinate is negative, the display apparatus 100 may determine that the touch gesture has shifted in the downward direction, and select a region of the D image signal in the downward direction.

As another exemplary embodiment, the display apparatus 100 may determine the direction of the touch gesture based on the change in the difference between the corner coordinates and the touch gesture coordinates according to the movement of the touch gesture. When the touch gesture moves, the difference between the coordinate of the touch gesture and the corner coordinate near the moving direction is reduced. That is, the display apparatus 100 may determine that the touch gesture moves toward a corner in the direction in which the difference between the coordinates of the touch gesture and the corner coordinates decreases. For example, if the touch gesture moves in the upward direction, the y-coordinate of the touch gesture decreases. Accordingly, the difference between the y-axis values between the K-corner coordinates or the L-corner coordinates and the touch gesture coordinates decreases. The display apparatus 100 may determine that the touch gesture moves in the direction of the K-corner or the L-corner. If the touch gesture moves in the downward direction, the y-coordinate of the touch gesture increases. Accordingly, the difference between the y-axis values between the M-corner coordinates or the N-corner coordinates and the touch gesture coordinates decreases. The display apparatus 100 may determine that the touch gesture moves in the direction of the M-corner or the N-corner.

Figures 7A, 7B:
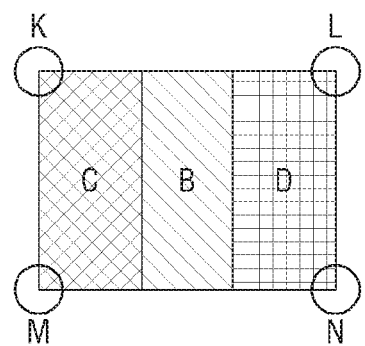
FIGS. 7A and 7B are views for explaining a fourth exemplary embodiment for selecting one of a plurality of regions.

FIGS. 7A and 7B are views for explaining a third exemplary embodiment for selecting one of a plurality of regions.

Referring to FIG. 7A, a screen including a plurality of regions corresponding to a plurality of image signals is shown. There are three image signals, and the C image signal may correspond to the left region, the B image signal may correspond to the middle region, and the D image signal may correspond to the right region.

Referring to FIG. 7B, a table for explaining a method of determining the moving direction of the touch gesture is shown. In one exemplary embodiment, the direction of the touch gesture may be determined using the relative coordinate difference between the starting and ending points of the touch gesture. The display apparatus 100 does not consider the starting point or touch point of the touch gesture when selecting a region. The display apparatus 100 may select a basic selection region when it receives a touch gesture for any point not moving. For example, the basic selection region may be a region corresponding to the B image signal corresponding to the middle region.

When the touch gesture moves in the left direction, the x-coordinate decreases based on the starting coordinates of the touch gesture. When the difference from the ending coordinate is calculated based on the starting coordinate, the difference (p) of the x-coordinate of the touch gesture is positive. If the difference in x-coordinate is positive, the display apparatus 100 may determine that the touch gesture has shifted to the left side, and select a region corresponding to the C image signal in the left direction. Since the display screen is divided into a left region and a right region, there is no influence on the y-coordinate.

When the touch gesture moves in the right direction, the x-coordinate increases based on the starting coordinates of the touch gesture. When the difference from the ending coordinate is calculated based on the starting coordinate, the difference (p) of the x-coordinate of the touch gesture is negative. If the difference in x-coordinate is negative, the display apparatus 100 may determine that the touch gesture has shifted to the right side, and select a region corresponding to the D image signal in the right direction.

As another exemplary embodiment, the display apparatus 100 may determine the direction of the touch gesture based on the change in the difference between the corner coordinates and the touch gesture coordinates according to the movement of the touch gesture. The difference between the corner coordinates and the coordinates of the touch gesture coordinate can be expressed as an absolute value. As described above, when the touch gesture moves, the difference between the coordinates of the touch gesture and the corner coordinates close to the moving direction is reduced. That is, the display apparatus 100 may determine that the touch gesture moves toward a corner in the direction in which the difference between the coordinates of the touch gesture and the corner coordinates decreases. For example, if the touch gesture moves in the left direction, the x-coordinate of the touch gesture decreases. Accordingly, the difference between the x-axis values between the K-corner coordinates or the M-corner coordinates and the touch gesture coordinates decreases. The display apparatus 100 may determine that the touch gesture moves in the direction of the K-corner or the M-corner. Accordingly, the display apparatus 100 may select a region corresponding to the C image signal in the left direction. If the touch gesture moves to the right, the x-coordinate of the touch gesture increases. Accordingly, the difference between the x-axis values between the L-corner coordinates or the N-corner coordinates and the touch gesture coordinates decreases. The display apparatus 100 may determine that the touch gesture moves in the direction of the L-corner or the N-corner. Accordingly, the display apparatus 100 may select a region corresponding to the D image signal in the right direction. The display apparatus 100 may select a basic selection region when it receives a touch gesture for any point not moving. For example, the basic selection region may be a region corresponding to the B image signal corresponding to the middle region.

Figures 8A, 8B:
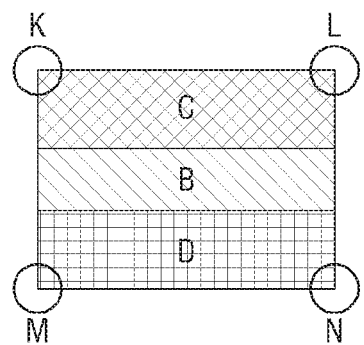
FIGS. 8A and 8B are views for explaining a fifth exemplary embodiment for selecting one of a plurality of regions.

FIGS. 8A and 8B are views for explaining a fifth exemplary embodiment for selecting one of a plurality of regions.

Referring to FIG. 8A, a screen including a plurality of regions corresponding to a plurality of image signals is shown. There are three image signals, and the C image signal may correspond to the upper region, the B image signal may correspond to the middle region, and the D image signal may correspond to the lower region.

Referring to FIG. 8B, a table for explaining a method of determining the moving direction of the touch gesture is shown. In one exemplary embodiment, the direction of the touch gesture may be determined using the relative coordinate difference between the starting and ending points of the touch gesture. The display apparatus 100 may select a basic selection region when it receives a touch gesture for any point not moving. For example, the basic selection region may be a region corresponding to the B image signal corresponding to the middle region.

When the touch gesture moves in the upward direction, the y-coordinate decreases based on the starting coordinates of the touch gesture. When the difference from the ending coordinate is calculated based on the starting coordinate, the difference (q) of the y-coordinate of the touch gesture is positive. If the difference in y-coordinate is positive, the display apparatus 100 may determine that the touch gesture has shifted in the upward direction, and select a region corresponding to the C image signal in the upward direction.

Since the display screen is divided into an upper region and a lower region, there is no influence on the x-coordinate.

When the touch gesture moves in the downward direction, the y-coordinate increases based on the starting coordinates of the touch gesture. When the difference from the ending coordinate is calculated based on the starting coordinate, the difference (q) of the y-coordinate of the touch gesture is negative. If the difference in y-coordinate is negative, the display apparatus 100 may determine that the touch gesture has shifted in the downward direction, and select a region corresponding to the D image signal in the downward direction.

As another exemplary embodiment, the display apparatus 100 may determine the direction of the touch gesture based on the change in the difference between the corner coordinates and the touch gesture coordinates according to the movement of the touch gesture. When the touch gesture moves, the difference between the coordinate of the touch gesture and the corner coordinate near the moving direction is reduced. That is, the display apparatus 100 may determine that the touch gesture moves toward a corner in the direction in which the difference between the coordinates of the touch gesture and the corner coordinates decreases. For example, if the touch gesture moves in the upward direction, the y-coordinate of the touch gesture decreases. Accordingly, the difference between the y-axis values between the K-corner coordinates or the L-corner coordinates and the touch gesture coordinates decreases. The display apparatus 100 may determine that the touch gesture moves in the direction of the K-corner or the L-corner. Accordingly, the display apparatus 100 may select a region corresponding to the C image signal in the upward direction. If the touch gesture moves in the downward direction, the y-coordinate of the touch gesture increases. Accordingly, the difference between the y-axis values between the M-corner coordinates or the N-corner coordinates and the touch gesture coordinates decreases. The display apparatus 100 may determine that the touch gesture moves in the direction of the M-corner or the N-corner. Accordingly, the display apparatus 100 may select a region corresponding to the D image signal in the downward direction. The display apparatus 100 may select a basic selection region when it receives a touch gesture for any point not moving. For example, the basic selection region may be a region corresponding to the B image signal corresponding to the middle region.

Figure 9A:
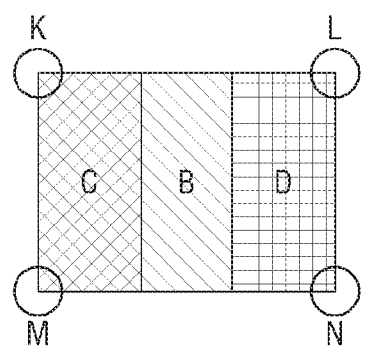
FIGS. 9A and 9B are views for explaining a sixth exemplary embodiment for selecting one of a plurality of regions.
Figure 9B:
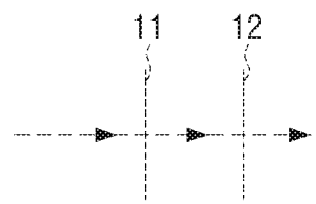

FIGS. 9A and 9B are views for explaining a sixth exemplary embodiment for selecting one of a plurality of regions.

Referring to FIG. 9A, a screen including a plurality of regions corresponding to a plurality of image signals is shown. There are three image signals, and the C image signal may correspond to the left region, the B image signal may correspond to the middle region, and the D image signal may correspond to the right region. The display apparatus may select one of the plurality of regions by considering the moving length of the directional touch gesture.

Referring to FIG. 9B, a process of selecting one region according to the moving length is shown. The display apparatus 100 may determine the direction of the touch gesture input on the display. Since the process of determining the direction of the touch gesture has been described above, the description is omitted herein. The moving length of the directional touch gesture may vary. In addition, the display apparatus 100 may have at least one threshold depending on the number of divided regions. For example, as shown in FIG. 9A, when the screen of the display apparatus 100 includes three regions horizontally or vertically, the display apparatus 100 may have two thresholds. When the screen of the display apparatus 100 includes four areas horizontally or vertically, the display apparatus 100 may have three thresholds.

As shown in FIGS. 9A and 9B, an exemplary embodiment for selecting a region when the screen of the display apparatus 100 includes three areas in a horizontal arrangement will be described. The display apparatus 100 may determine the direction of the touch gesture as described above. As shown in FIG. 9B, the display apparatus 100 may determine that the touch gesture moves in the right direction. The display apparatus 100 may have two thresholds. In addition, the display apparatus 100 may also consider the moving length of the touch gesture. If the touch gesture moves in the x-axis direction to less than a first threshold value 11, the display apparatus 100 may select a region corresponding to the C image signal disposed at the leftmost side. If the touch gesture moves in the x-axis direction to greater than the first threshold value 11 and less than a second threshold value 12, the display apparatus 100 may select a region corresponding to the B image signal disposed in the middle. If the touch gesture moves in the x-axis direction to greater than the second threshold value 12, the display apparatus 100 may select a region corresponding to the D image signal disposed at the rightmost side. That is, when the touch gesture moves beyond the (n−1)th threshold value and less than the n-th threshold value in the rightward direction with respect to the x-axis, the display apparatus 100 may select the n-th region adjacent to the right side of the (n−1)th region.

Figure 10A:
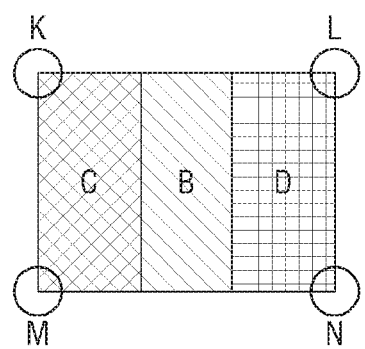
FIGS. 10A and 10B are views for explaining a seventh exemplary embodiment for selecting one of a plurality of regions.
Figure 10B:
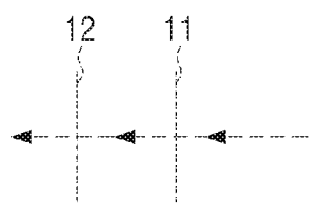

FIGS. 10A and 10B are views for explaining a seventh exemplary embodiment for selecting one of a plurality of regions.

Referring to FIG. 10A, a screen including a plurality of regions corresponding to a plurality of image signals is shown. There are three image signals, and the C image signal may correspond to the left region, the B image signal may correspond to the middle region, and the D image signal may correspond to the right region.

Referring to FIG. 10B, a process of selecting one region according to the moving length is shown. The display apparatus 100 may determine the direction of the touch gesture input on the display. An exemplary embodiment for selecting a region when the screen of the display apparatus 100 includes three regions in a horizontal arrangement will be described. The display apparatus 100 may determine the direction of the touch gesture as described above. As shown in FIG. 10B, the display apparatus 100 may determine that the touch gesture moves in the leftward direction. The display apparatus 100 may have two thresholds. In addition, the display apparatus 100 may also consider the moving length of the touch gesture. If the touch gesture moves in the x-axis direction to less than the first threshold value 11, the display apparatus 100 may select a region corresponding to the D image signal disposed at the rightmost side. If the touch gesture moves in the x-axis direction to greater than the first threshold value 11 and less than a second threshold value 12, the display apparatus 100 may select a region corresponding to the B image signal disposed in the middle. If the touch gesture moves in the x-axis direction to greater than the second threshold value 12, the display apparatus 100 may select a region corresponding to the C image signal disposed at the leftmost side. That is, when the touch gesture moves beyond the (n−1)th threshold value and less than the n-th threshold value in the leftward direction with respect to the x-axis, the display apparatus 100 may select the n-th region adjacent to the left side of the (n−1)th region.

Figure 11A:
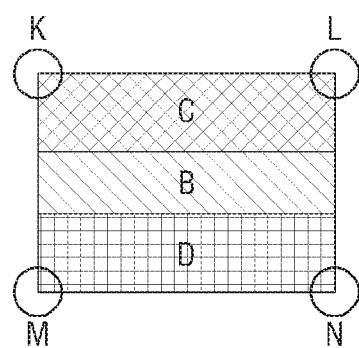
FIGS. 11A and 11B are views for explaining an eighth exemplary embodiment for selecting one of a plurality of regions.
Figure 11B:
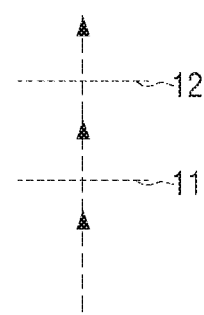

FIGS. 11A and 11B are views for explaining an eighth exemplary embodiment for selecting one of a plurality of regions.

Referring to FIG. 11A, a screen including a plurality of regions corresponding to a plurality of image signals is shown. There are three image signals, and the C image signal may correspond to the upper region, the B image signal may correspond to the middle region, and the D image signal may correspond to the lower region.

Referring to FIG. 11B, a process of selecting one region according to the moving length is shown. The display apparatus 100 may determine the direction of the touch gesture input on the display. An exemplary embodiment for selecting a region when the screen of the display apparatus 100 includes three regions in a vertical arrangement will be described. The display apparatus 100 may determine the direction of the touch gesture as described above. As shown in FIG. 11B, the display apparatus 100 may determine that the touch gesture moves in the upward direction. The display apparatus 100 may have two thresholds. In addition, the display apparatus 100 may also consider the moving length of the touch gesture. If the touch gesture moves in the y-axis direction to less than the first threshold value 11, the display apparatus 100 may select a region corresponding to the D image signal disposed at the lowest side. If the touch gesture moves in the x-axis direction to greater than the first threshold value 11 and less than the second threshold value 12, the display apparatus 100 may select a region corresponding to the B image signal disposed in the middle. If the touch gesture moves in the y-axis direction to greater than the second threshold value 12, the display apparatus 100 may select a region corresponding to the C image signal disposed at the top. That is, when the touch gesture moves beyond the (n−1)th threshold value and less than the n-th threshold value in the upward direction with respect to the y-axis, the display apparatus 100 may select the n-th region adjacent to the upper side of the (n−1)th region.

Figure 12A:
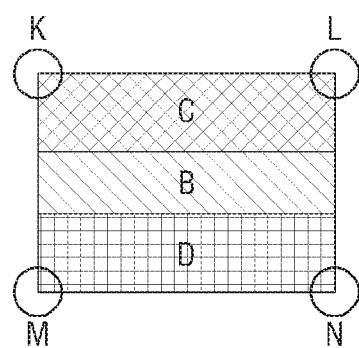
FIGS. 12A and 12B are views for explaining a ninth exemplary embodiment for selecting one of a plurality of regions.
Figure 12B:
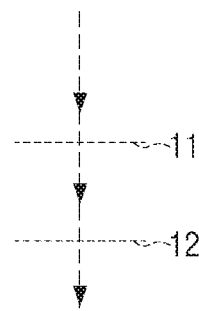

FIGS. 12A and 12B are views for explaining a ninth exemplary embodiment for selecting one of a plurality of regions.

Referring to FIG. 12A, a screen including a plurality of regions corresponding to a plurality of image signals is shown. There are three image signals, and the C image signal may correspond to the upper region, the B image signal may correspond to the middle region, and the D image signal may correspond to the lower region.

Referring to FIG. 12B, a process of selecting one region according to the moving length is shown. The display apparatus 100 may determine the direction of the touch gesture input on the display. An exemplary embodiment for selecting a region when the screen of the display apparatus 100 includes three regions in a vertical arrangement will be described. The display apparatus 100 may determine the direction of the touch gesture as described above. As shown in FIG. 12B, the display apparatus 100 may determine that the touch gesture moves in the downward direction. The display apparatus 100 may have two thresholds. In addition, the display apparatus 100 may also consider the moving length of the touch gesture. If the touch gesture moves in the y-axis direction to less than the first threshold value 11, the display apparatus 100 may select a region corresponding to the C image signal disposed at the top. If the touch gesture moves in the x-axis direction to greater than the first threshold value 11 and less than the second threshold value 12, the display apparatus 100 may select a region corresponding to the B image signal disposed in the middle. If the touch gesture moves in the y-axis direction to greater than the second threshold value 12, the display apparatus 100 may select a region corresponding to the D image signal disposed at the lowest side. That is, when the touch gesture moves beyond the (n−1)th threshold value and less than the n-th threshold value in the downward direction with respect to the y-axis, the display apparatus 100 may select the n-th region adjacent to the lower side of the (n−1)th region.

The above-described exemplary embodiments are exemplary, and the display apparatus 100 can configure a plurality of regions corresponding to a plurality of video signals in various formats. In addition, the display apparatus 100 can select one region in various ways according to the shape of the configured region or the like. A controlling method of a display apparatus will be described below.

Figure 13:
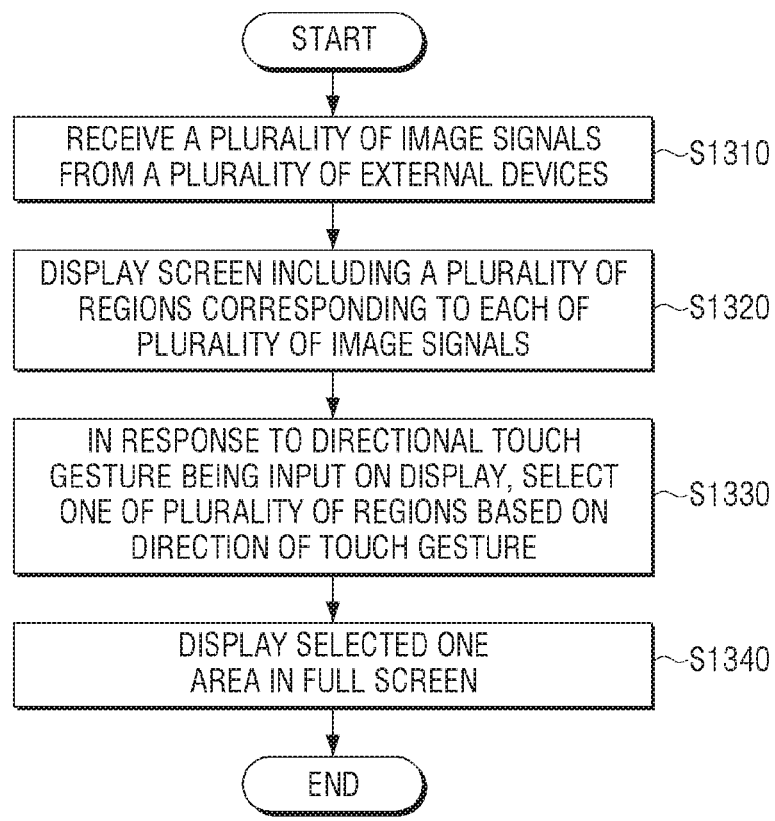
FIG. 13 is a flowchart illustrating a control method of the display apparatus according to an exemplary embodiment.

FIG. 13 is a flowchart illustrating a controlling method of the display apparatus according to an exemplary embodiment.

The display apparatus receives a plurality of image signals from a plurality of external devices, at operation S1310. The plurality of external devices may be connected to the display apparatus by wire or wirelessly. In addition, the plurality of external devices may transmit the respective image signals to the display apparatus. The display apparatus may reconfigure the plurality of image signal received from the plurality of external devices.

The display 130 displays a screen including a plurality of regions corresponding to each of the plurality of image signals, at operation S1320. That is, the display apparatus may divide the screen into a plurality of regions and display images of the received image signals in the divided regions.

When a directional touch gesture is input on the display, the display apparatus selects one of the plurality of regions based on the direction of the touch gesture, at operation S1330. When the display apparatus selects one area, the direction of the touch gesture may be calculated by using the relative coordinates of the starting point and the ending point of the directional touch gesture. The display apparatus may also select one of the plurality of regions by considering the moving length of the directional touch gesture. That is, the processor 120 does not consider the starting point of the directional touch gesture.

The display apparatus displays the selected one area in full screen, at operation S1340. In addition, when the display apparatus receives a touch command on the displayed full screen, the display apparatus may transmit the touch command to an external device that transmits an image signal corresponding to the full screen.

For example, the display apparatus control method may be implemented as a program and stored in a non-transitory computer readable medium.

The non-transitory computer readable medium refers to a medium that stores data semi-permanently rather than storing data for a very short time, such as a register, a cache, a memory or etc., and is readable by an apparatus. In detail, programs for executing the aforementioned various methods may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting. The present teaching can be readily applied to other types of apparatuses and processes. Also, the description of exemplary embodiments is intended to be illustrative, and not to limit the scope of the claims, and many alternatives, modifications, and variations will be apparent to those skilled in the art.

What is claimed is:

1. A display apparatus comprising:
   a communication interface;
   a display comprising a touch module; and
   a processor configured to:
   receive, through the communication interface, a plurality of image signals from a plurality of external devices,
   control the display to display a plurality of images in a plurality of regions respectively, each of the plurality of images corresponding to each of the plurality of image signals,
   based on a first point and a second point of a touch gesture being input on the touch module, identify a moving direction of the touch gesture,
   select a region from among the plurality of regions based on the identified moving direction of the touch gesture, and
   adjust a display size of the selected region.

2. The display apparatus as claimed in claim 1, wherein the processor is further configured to, based on a touch command being input while the display size of the selected region is adjusted, control the communication interface to transmit the touch command to an external device that transmits an image signal corresponding to the selected region among the plurality of image signals.

3. The display apparatus as claimed in claim 1, wherein the processor is further configured to:
   identify an x-axis value based on a difference between an x-coordinate of a starting point of the touch gesture and an x-coordinate of an ending point of the touch gesture,
   identify a y-axis value based on a difference between a y-coordinate of the starting point of the touch gesture and a y-coordinate of the ending point of the touch gesture, and
   select the region from among the plurality of regions based on the x-axis value and the y-axis value.

4. The display apparatus as claimed in claim 3, wherein the processor is further configured to:
   in a state in which the plurality of regions includes three regions respectively arranged on a left side, a right side and a first middle between the left side and the right side, select a region arranged in the first middle based on a touch gesture for selecting one point being input on the touch module, select a region arranged on the left side based on the x-axis value being positive, and select a region arranged on the right side based on the x-axis value being negative, and
   in a state in which the plurality of regions includes three regions arranged on an upper side, a lower side and a second middle between the upper side and the lower side, select a region arranged in the second middle based on the touch gesture for selecting the one point being input on the touch module, select a region arranged on the upper side based on the y-axis value being positive, and select a region arranged on the lower side based on the y-axis value being negative.

5. The display apparatus as claimed in claim 3, wherein the processor is further configured to, in a state in which the plurality of regions includes four regions respectively arranged on an upper left portion, an upper right portion, a lower left portion, and a lower right portion, select a region arranged on the upper left portion based on the x-axis value being positive and the y-axis value being positive, select a region arranged on the upper right portion based on the x-axis value being negative and the y-axis value being positive, select a region arranged on the lower left portion based on the x-axis value being positive and the y-axis value being negative, and select a region arranged on the lower right portion based on the x-axis value being negative and the y-axis value being negative.

6. The display apparatus as claimed in claim 3, wherein the processor is further configured to select the region from among the plurality of regions based on a moving length of the touch gesture.

7. The display apparatus as claimed in claim 6, wherein the processor is further configured to:
   in a state in which the plurality of regions are arranged in a horizontal arrangement format in a left direction and a right direction and the x-axis value is positive, select a first region arranged on a rightmost side based on an x-axis moving length being less than a first threshold value, select a second region adjacent to a left side of the first region based on the x-axis moving length being greater than the first threshold value and less than a second threshold value, and select an n region adjacent to a left side of a (n−1) region based on the x-axis moving length being greater than an (n−1) threshold value and less than an n threshold value, and
   in a state in which the x-axis value is negative, select the n region based on the x-axis moving length being less than the first threshold value, select the (n−1) region based on the x-axis moving length being greater than the first threshold value and less than the second threshold value, and select the second region based on the x-axis moving length greater than the (n−1) threshold value and less than the n threshold value.

8. The display apparatus as claimed in claim 1, wherein the processor is further configured to identify a first region from among the plurality of regions based on the moving direction corresponding to a first direction and select a second region from among the plurality of regions as the selected region based on the moving direction corresponding to a second direction.

9. A controlling method of a display apparatus comprising a communication interface and a display, the controlling method comprising:
   receiving, through the communication interface, a plurality of image signals from a plurality of external devices;
   displaying a plurality of images in a plurality of regions of the display respectively, each of the plurality of images corresponding to each of the plurality of image signals;
   based on a first point and a second point of a touch gesture being input on a touch module which is disposed on the display, identifying a moving direction of the touch gesture;
   selecting a region from the plurality of regions based on the identified moving direction of the touch gesture; and
   adjusting a display size of the selected region.

10. The controlling method as claimed in claim 9, further comprising based on a touch command being input while the display size of the selected region is adjusted, transmitting the touch command to an external device that transmits an image signal corresponding to the selected region among the plurality of image signals.

11. The controlling method as claimed in claim 9, wherein the selecting comprises:

identifying an x-axis value based on a difference between an x-coordinate of a starting point of the touch gesture and an x-coordinate of an ending point of the touch gesture;

identifying a y-axis value based on a difference between a y-coordinate of the starting point of the touch gesture and a y-coordinate of the ending point of the touch gesture; and selecting the region from among the plurality of regions based on the x-axis value and the y-axis value.

12. The controlling method as claimed in claim 11, wherein the selecting comprises:

in a state in which the plurality of regions includes three regions respectively arranged on a left side, a right side and a first middle between the left side and the right side, selecting a region arranged in the first middle based on a touch gesture for selecting one point being input on the touch module, selecting a region arranged on the left side based on the x-axis value being positive, and selecting a region arranged on the right side based on the x-axis value being negative, and in a state in which the plurality of regions includes three regions arranged on an upper side, a lower side and a second middle between the upper side and the lower side, selecting a region arranged in the second middle based on the touch gesture for selecting the one point being input on the touch module, selecting a region arranged on the upper side based on the y-axis value being positive, and selecting a region arranged on the lower side based on the y-axis value being negative.

13. The controlling method as claimed in claim 11, wherein the selecting comprises, in a state in which the plurality of regions includes four regions respectively arranged on an upper left portion, an upper right portion, a lower left portion, and a lower right portion, selecting a region arranged on the upper left portion based on the x-axis value being positive and the y-axis value being positive, selecting a region arranged on the upper right portion based on the x-axis value being negative and the y-axis value being positive, selecting a region arranged on the lower left portion based on the x-axis value being positive and the y-axis value being negative, and selecting a region arranged on the lower right portion based on the x-axis value being negative and the y-axis value being negative.

14. The controlling method as claimed in claim 11, wherein the selecting comprises selecting the region from among the plurality of regions based on a moving length of the touch gesture.

15. The controlling method as claimed in claim 14, wherein the selecting comprises:

in a state in which the plurality of regions are arranged in a horizontal arrangement format arranged in a left direction and a right direction and the x-axis value is positive, selecting a first region arranged on a rightmost side based on an x-axis moving length being less than a first threshold value, selecting a second region adjacent to a left side of the first region based on the x-axis moving length being greater than the first threshold value and less than a second threshold value, and selecting an n region adjacent to a left side of a (n−1) region based on the x-axis moving length being greater than an (n−1) threshold value and less than an n threshold value, and in a state in which the x-axis value is negative, selecting the n region based on the x-axis moving length being less than the first threshold value, selecting the (n−1) region based on the x-axis moving length being greater than the first threshold value and less than the second threshold value, and selecting the second region based on the x-axis moving length being greater than the (n−1) threshold value and less than the n threshold value.

16. A non-transitory computer readable recording medium having stored thereon a computer program for executing a method for controlling a display apparatus including a communication interface and a display, the method including:

receiving, through the communication interface, a plurality of image signals from a plurality of external devices;

displaying a plurality of images in a plurality of regions of the display respectively, each of the plurality of images corresponding to a respective one of the plurality of image signals;

based on a first point and a second point of a touch gesture being input on a touch module which is disposed on the display, identifying a moving direction of the touch gesture;

selecting a region from the plurality of regions based on the identified moving direction of the touch gesture; and adjusting a display size of the selected region based on the touch gesture.

* * * * *